Patented Dec. 26, 1933

1,941,055

UNITED STATES PATENT OFFICE 1,941,055

INSECTICIDE

Henry L. Renard, Basking Ridge, N. J.

No Drawing. Application June 6, 1931
Serial No. 542,695

4 Claims. (Cl. 167—32)

This invention relates to an insecticide and more particularly to an insecticide which is applied on the ground for killing insects which normally live in the soil such as the majority of the varieties of thrip, the centipede commonly called wire-worm, all beetles that affect plants, sow bugs, manure and other ground worms, various flies and the like.

The principal object of this invention is to provide an insecticide which is a complete exterminator for insects of the character referred to above and at the same time is harmless to stems or roots of plants.

Other objects and advantages of the invention will become apparent during the course of the following description.

According to the practice most generally followed, insecticides are either sprayed or dusted on plants in order to kill the insects thereon. However, since the majority of insects which produce the greatest damage to plants ordinarily live in the soil or come in contact with it frequently, I have considered it advisable to apply a suitable insecticide to the soil in order to kill the insects before they have an opportunity to leave the soil. Of course, in some instances the insects or their larvae may not be in the soil at the time of the application of the insecticide but if an insecticide of suitable lasting qualities is employed or if the material is applied at sufficiently frequent intervals, the insects which later come in contact with the soil will be exterminated before they have an opportunity to return to the plants.

Failing in an effort to find an insecticide effective for use in the manner just described, I have developed an insecticide which, as a result of exhaustive tests and practical application on a commercial scale, I have found to meet the necessary requirements. The insecticide which I have produced has been found to be a complete exterminator for insects of the character set forth above, is particularly adapted for use by applying it to the ground around the plants, is harmless to stems or roots of plants and retains its exterminating properties for a relatively long period of time.

In preparing my new insecticide, I mix four parts by weight of naphthalene (so-called "flake naphtha"), with one part of fumigating tobacco dust of approximately 1 per cent. nicotine content. The resulting mixture is then ground to a relatively finely divided condition, preferably 30 mesh. The resulting product is then in condition for use.

Fumigating tobacco dust is a commercial product consisting of the ground refuse of a tobacco stripping plant. As supplied commercially, this tobacco dust may be obtained with a nicotine content of 1 per cent., 2 per cent., etc. In addition to fumigating tobacco dust, there is offered on the market a dusting tobacco dust which also may be obtained with a nicotine content of varying percentages. I have found that any tobacco dust of the various types supplied may be used with some measure of success in the practice of my present invention. However, tests have demonstrated that somewhat superior results are obtained if fumigating tobacco dust is employed, particularly a fumigating tobacco dust having a 1 per cent. nicotine content.

While I prefer to employ the ingredients in the proportion of 4 parts of naphtha to 1 part of tobacco dust, this exact proportion may be varied without wholly destroying the effectiveness of the composition. For example, the materials may be used in equal quantities or, in an extreme case, 10 parts of naphtha may be employed to 1 part of tobacco dust. However, the one-to-one product may, in some instances, be found to be damaging to plant roots whereas the ten-to-one product may not always effect a sufficient "kill". After numerous experiments I have found that the four-to-one product is best for general use and accordingly I recommend that such proportions be employed.

While the grinding of the final product to approximately 30 mesh is not essential and a somewhat finer or coarser product may be used with some degree of success, practical tests have demonstrated that a thirty mesh product appears to be most satisfactory and is recommended.

When the naphthalene and tobacco dust are ground together the separate materials appear to lose their individual identities. For example, when examined under the microscope the particles of naphthalene appear to be impregnated with minute portions of nicotine. While the vegetable content of the tobacco dust does not become directly incorporated with the naphthalene particles, it has been noticed that apparently the vegetable particles absorb to some degree a portion of the naphthalene in that the particles of vegetable matter possess the marked odor of naphthalene.

Another important feature is that the presence of the vegetable matter in the mixture appears to reduce the normal volatility of the naphthalene, this apparently being due to the absorption of some of the naphthalene by the vegetable matter, as mentioned above, whereby the naphthalene is more difficultly volatile therefrom than under ordinary conditions when the naphthalene is not mixed with the dust.

In treating plants for the control of insects the material is spread on the ground around the plants. The amount of material used may be varied considerably since the mixture seems to be wholly harmless to the stems or roots of plants regardless of the amount of the material used. However, I have found that satisfactory control can be obtained by using about one pound to 40 or 50 square feet. In case the infestation is light about one-half this amount is sufficient to secure complete control.

After the material is spread on the ground it must be wetted in order to secure best results. The wetting serves two principal purposes. In the first place, it carries the mixture down through the porous portions of the soil whereby the material is brought in contact with insects below the surface. Secondly, the addition of water apparently assists in volatilizing the naphthalene, particularly that portion of the naphthalene which has been absorbed by the vegetable content of the dust.

Actual demonstrations on numerous occasions have exhibited the marked killing power of the preparation. For example, in one particular green-house which was most seriously affected by a great variety of insects including the particularly damaging thrip, an application of the material over the entire plant produced a killing in a few minutes' time after application. Moreover, the control persisted for approximately six weeks before the insects began to appear again. This was not due to the lasting effect of the material but rather to the complete extermination of the insects. However, it has been found that the effect of the material will last for from 6 to 10 days after it has been applied. For example, if the material is wetted shortly after its application it becomes effective and even after it has dried out it may again be made effective within a period of from 6 to 10 days by again wetting the ground.

Numerous tests have been conducted in an effort to determine whether comparable results could be obtained by separate application of the naphthalene and the tobacco dust. However, it has been found that satisfactory results cannot be obtained in this manner. In the first place, the killing effect of the materials used separately does not begin to approach that of the material when used in admixture in the manner set forth above. Secondly, when used separately the naphthalene is so volatile that whatever effect it may have is only temporary due to the disappearance of the material from the area treated due to the volatilization of the material. Moreover, when the naphthalene is used separately it is very likely to cause burning or scalding of the roots of plants, particularly in warm weather. Finally, when the materials are used separately the nicotine content of the tobacco dust is not available for killing purposes nearly to the extent that it is when used in intimate admixture with the naphthalene as set forth above. Furthermore, it has been known for many years that the use of dusting tobacco dust when employed alone has a marked tendency to burn or scald the vegetation. This however, is not true when the material is used in the manner set forth.

While I have described in detail the preferred embodiment of my invention it is to be understood that the details of procedure may be variously modified without departing from the spirit of the invention or the scope of the subjoined claims.

I claim:

1. An insecticide comprising finely divided particles of naphthalene and tobacco dust, the particles of naphthalene being impregnated with a portion of the nicotine content of said tobacco dust, and the particles of vegetable matter present in said tobacco dust having a portion of said naphthalene absorbed therein.

2. An insecticide comprising an intimate association of naphthalene and fumigating tobacco dust in finely divided condition, the particles of naphthalene being impregnated with a portion of the nicotine content of said tobacco dust, and the particles of vegetable matter present in said tobacco dust having a portion of said naphthalene absorbed therein.

3. An insecticide comprising an intimate association of fumigating tobacco dust of approximately 1% nicotine content and naphthalene in the form of finely divided particles of approximately thirty mesh, the particles of naphthalene being impregnated with a portion of the nicotine content of said tobacco dust, and the particles of vegetable matter present in said tobacco dust having a portion of said naphthalene absorbed therein.

4. An insecticide comprising fumigating tobacco dust of approximately 1% nicotine content and naphthalene in the form of finely divided particles of approximately thirty mesh, the said constituents being present in the proportion of approximately one part of tobacco dust to four parts of the naphthalene, the particles of naphthalene being impregnated with a portion of the nicotine content of said tobacco dust, and the particles of vegetable matter present in said tobacco dust having a portion of said naphthalene absorbed therein.

HENRY L. RENARD.